July 13, 1937.  A. O. McCOLLUM  2,086,814
STEERING MECHANISM
Filed June 20, 1934  4 Sheets-Sheet 2

INVENTOR
ANDREW O. McCOLLUM
BY
ATTORNEY

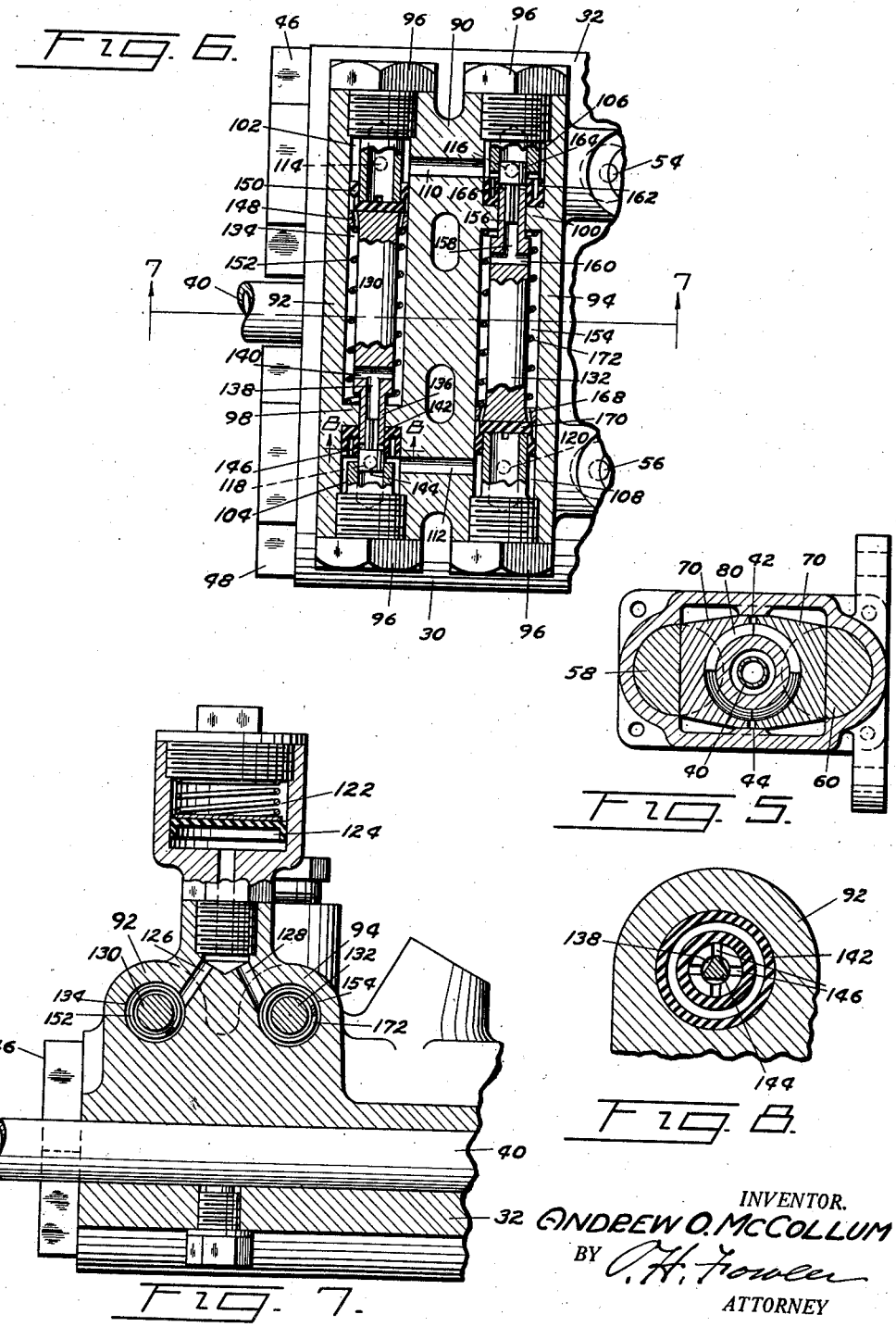

July 13, 1937.  A. O. McCOLLUM  2,086,814
STEERING MECHANISM
Filed June 20, 1934  4 Sheets-Sheet 4

INVENTOR
ANDREW O. McCOLLUM
BY
ATTORNEY

Patented July 13, 1937

2,086,814

UNITED STATES PATENT OFFICE 2,086,814

STEERING MECHANISM

Andrew O. McCollum, Detroit, Mich., assignor to Hydraulic Brake Company, Detroit, Mich., a corporation of California Application June 20, 1934, Serial No. 731,510

6 Claims. (Cl. 60—54.5)

This invention relates to steering mechanism, and more particularly to fluid pressure steering mechanism.

An object of the invention is to provide an efficient and simplified fluid pressure operated steering mechanism for motor vehicles.

Another object of the invention is to provide a fluid pressure operated steering mechanism in which a maximum amount of movement may be given to the steering traction wheels of a vehicle by a minimum amount of movement of the steering wheel.

Another object of the invention is to provide a fluid pressure operated steering mechanism for a motor vehicle including means for synchronizing a fluid compression means with a fluid pressure actuated means.

A further object of the invention is to provide a fluid pressure operated steering mechanism for motor vehicles having means automatically operable to compensate for expansion or contraction of the fluid in the system due to changes in atmospheric conditions.

Other objects of the invention will appear from the following description taken in connection with the drawings which form a part of this specification, and in which:—

Figure 5 is a cross-sectional view of the fluid compression mechanism substantially on line 5—5, Fig. 2;

Figure 6 is an enlarged sectional view substantially on line 6—6, Figure 3;

Figure 7 is an enlarged sectional view substantially on line 7—7, Figure 6;

Figure 8 is a detail view of a valve mechanism;

Figure 1:
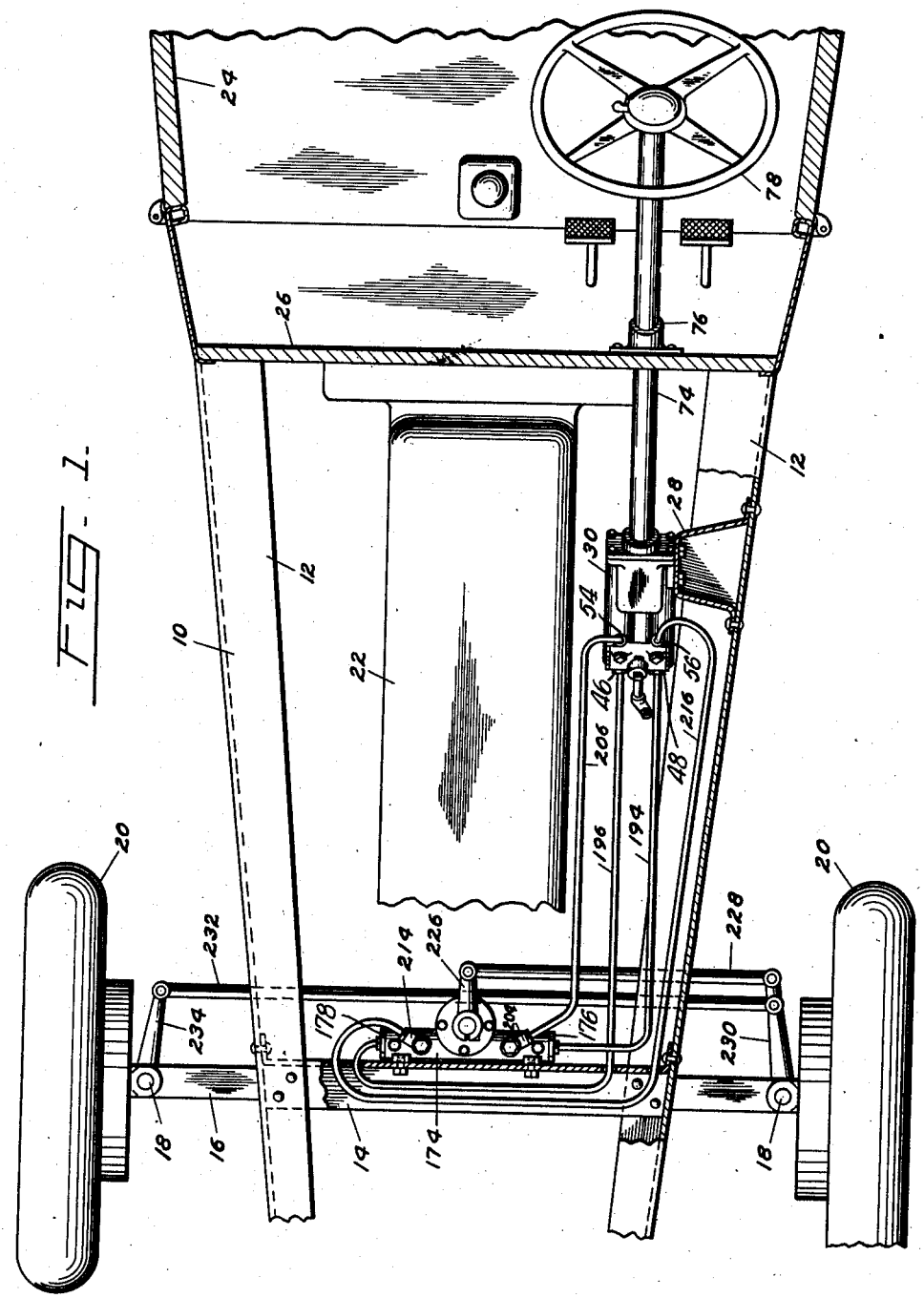
Figure 1 is a top plan view of a motor vehicle partly broken away illustrating the invention as installed.
Figure 2:
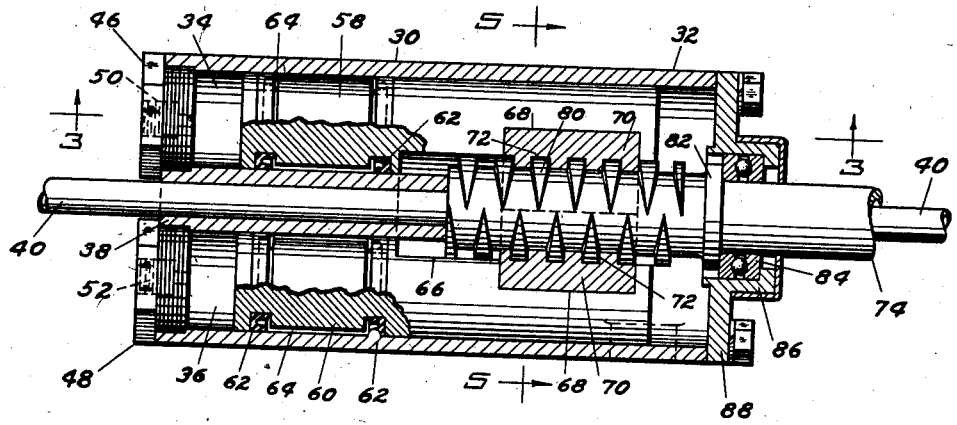
Figure 2 is a longitudinal sectional view of a fluid compression mechanism.
Figure 3:
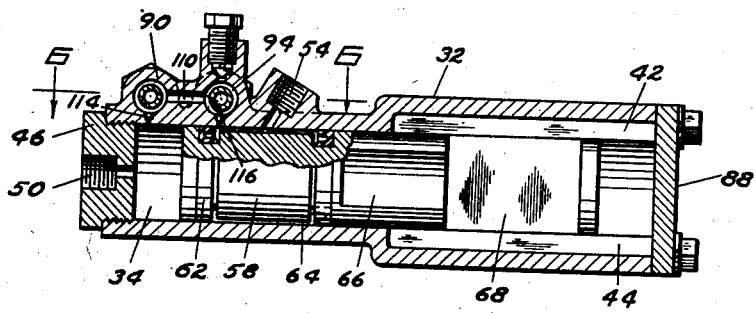
Figure 3 is a sectional view substantially on line 3—3, Figure 2.
Figure 4:
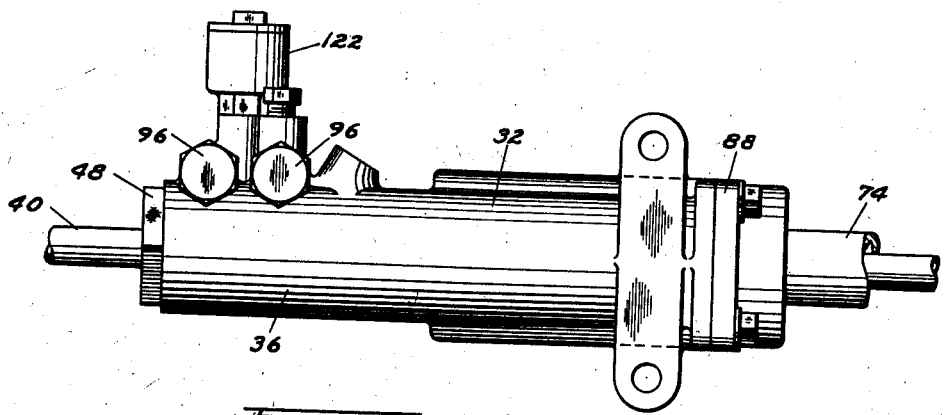
Figure 4 is a side elevation of of the fluid compression mechanism.
Figure 9:
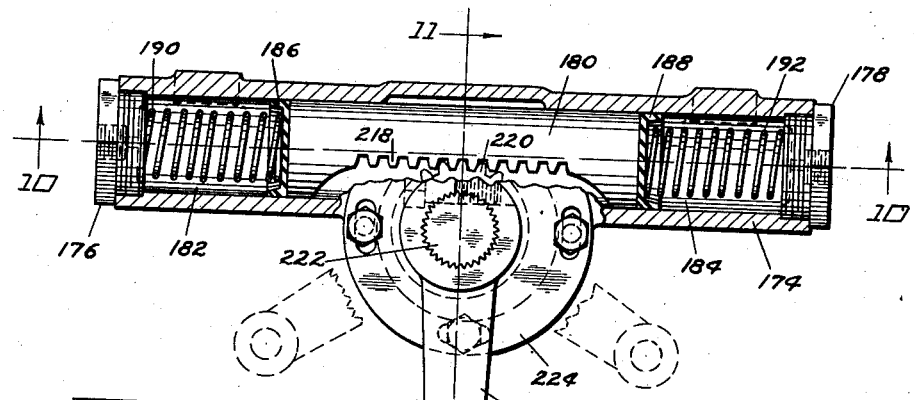
Figure 9 is a longitudinal sectional view of the fluid pressure actuated mechanism.
Figure 10:
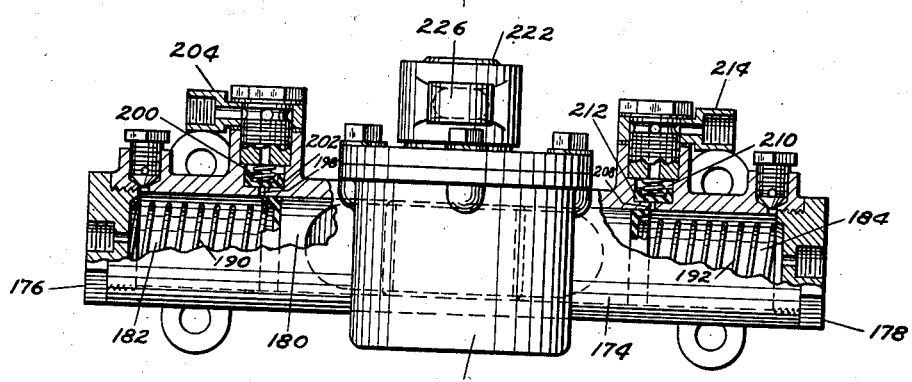
Figure 10 is a side elevation of the fluid actuated mechanism partly in section, the section being substantially on line 10—10, Figure 9.
Figure 11:
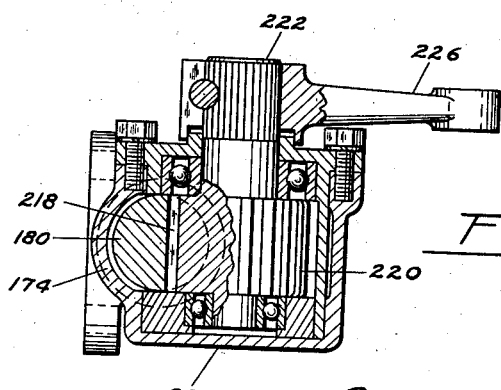
Figure 11 is a cross-sectional view substantially on line 11—11, Figure 9.

Referring to the drawings for more specific details of the invention, 10 represents a motor vehicle chassis frame including side members 12 connected by cross-members 14. The frame is supported by an axle 16 having steering knuckles 18 pivoted to the respective ends of the axle, and wheels 20 are rotatably mounted on the steering knuckles. The frame supports a prime mover 22, and a body 24 including a dash 26.

A bracket 28 secured on one of the side members 12 of the chassis frame supports a fluid compression mechanism 30. This mechanism includes a casting 32 having therein parallel cylinders 34 and 36 spaced apart by a web 38 bored to receive a throttle control rod 40, and formed in one end of the casting are diametrically disposed guides 42 and 44. The cylinders have heads 46 and 48 provided with discharge ports 50 and 52, and inlet ports 54 and 56.

Corresponding reciprocal pistons 58 and 60 in the cylinders 34 and 36 are each provided with spaced circumferential grooves in which are fitted leak-proof cups 62, and that portion of the piston between the cups 62 is reduced in cross-section to provide an annular chamber 64. Each piston is cut away as at 66, and seated in a notch 68 in the cut-away portion is a case-hardened block 70 adapted to slide freely on the guides 42 and 44, and the blocks have opposed threaded faces 72 the object of which will hereinafter appear.

A steering column 74 supported in a steering post 76 on the dash 26 has secured thereto a conventional steering wheel 78. The steering column encloses the throttle control rod 40 and abuts the web 38. The column has formed thereon right and left threads 80 receiving the threads 72 on the blocks 70, and a collar 82 on the column supports one race of a thrust bearing 84, the other race of which is supported in a sleeve 86 formed on a head 88 bolted or otherwise secured to the casting.

A valve 90 on the wall of the cylinders 34 and 36 includes parallel cylinders 92 and 94 having their respective ends closed as by heads 96. The latter cylinders are divided by diaphragms 98 and 100 into compartments 102, 104, 106 and 108, and the diaphragms have concentric openings. The compartments 102 and 106 are connected by a passage 110, and the compartments 104 and 108 are connected by a passage 112. The compartments 102 and 106 each has a port 114 and 116 communicating with the cylinder 34, and the compartments 104 and 108 each has a port 118 and 120 communicating with the cylinder 36. The cylinders 92 and 94 are supplied with fluid from a reservoir 122, and the reservoir has therein a spring-pressed piston 124 for placing the fluid under pressure. The reservoir is connected to the cylinders 92 and 94 by a passage 126 and 128 respectively.

The cylinders 92 and 94 have therein corresponding spring-pressed pistons 130 and 132 arranged in an oppositely disposed relation with respect to one another. The piston 130 in the cylinder 92 has a reduced body portion providing an annular chamber 134 and a concentric extension 136 reciprocable in the opening in the diaphragm 98 and the compartment 104. The extended portion has an axial passage 138 communicating with a diametral passage 140 through the body of the piston. A leak-proof cup 142 is seated on the diaphragm 98 within the compartment 104, and a flange on the inner perimeter of the cup extends beyond the end of the extension 136 when the piston is in retracted position. The cup provides, in conjunction with a plug 144 fitted in the open end of the passage 138, a valve 146 for controlling the flow of fluid from one compartment to another. The head of the piston has a plurality of passages 148 controlled by a collapsible leak-proof cup 150 seated on the head, and a spring 152 sleeved on the piston between its head and the diaphragm 98 urges the piston to its seat.

The piston 132 is identical with the piston 130 but is arranged in the oppositely disposed position. This piston has a reduced body portion providing an annular chamber 154 and a concentric extension 156 reciprocable in the opening in the diaphragm 100 and the compartment 106. The extension 156 has an axial passage 158 communicating with a diametral passage 160 through the body of the piston. A leak-proof cup 162 is seated on the diaphragm 100 within the compartment 106. This cup has a flange on its inner perimeter extending beyond the concentric extension 156 when the piston is in retracted position. The cup provides in cooperation with a plug 164 fitted in the open end of the passage 158 a valve for control of ports 166 providing communications between the chamber 106 and the passage 158 for the flow of fluid from chamber 106 through the passages 158 and 160 to the chamber 154, and thence to the reservoir. The head of the piston has a plurality of openings 168 controlled by a collapsible leak-proof cup 170 seated on the head, and a spring 172 sleeved on the piston between its head and the diaphragm 100 urges the piston to its seat.

A cylinder 174 bolted or otherwise secured to the forward cross-member of the chassis frame has heads 176 and 178 threaded in its respective ends. A double-end reciprocal piston 180 in the cylinder divides the cylinder into two chambers 182 and 184. The piston has on its respective heads leak-proof cups 186 and 188 held against displacement by springs 190 and 192 interposed between the cups and the respective heads. The head 176 has a port connected by a conduit 194 to a port in the head 48 of the cylinder 36, and the head 178 has a port connected by a conduit 196 to a port in the head 46 of the cylinder 34.

The chamber 182 of the cylinder 174 has a port 198 communicating with a valve chamber 200 having therein a check valve 202 controlling the port, and the chamber is connected as by a fitting 204 and a conduit 206 to the port 54 in the cylinder 34. The other chamber 184 of the cylinder 174 has a port 208 communicating with a chamber 210 having therein a check valve 212 for the control of the port, and the chamber is connected by a fitting 214 and a conduit 216 to the port 56 in the cylinder 36.

The piston 180 has a rack 218 in mesh with a gear 220 formed on a shaft 222 suitably journaled in a housing 224 formed integral with the cylinder 174, and keyed to the shaft is an arm 226 connected by a drag-link 228 to a steering arm 230. The steering arm 230 is connected by a rod 232 to another steering arm 234, the steering arms being formed integral with the steering knuckles 18.

In the operation of a motor vehicle equipped with this fluid pressure steering mechanism, the operator steers the vehicle in the conventional manner. Should the operator desire to make a right-hand turn, the steering wheel 78 is turned to the right. This movement of the steering wheel is transmitted through the steering column 74 and threads thereon to the blocks 70 to move the blocks in reverse direction, and this movement of the blocks 70 is transmitted to the pistons 58 and 60 to move the piston 60 on its compression stroke and to move the piston 58 on its retraction stroke.

As the piston 60 moves on its compression stroke, the fluid in the cylinder 36 is displaced through the conduit 194 to the chamber 182 of the cylinder 174, resulting in moving piston 180 to the right. This movement of the piston 180 is transmitted through the rack 218 and pinion 220 to the shaft 222 resulting in rotation of the shaft and turning the arm 226 attached thereto to the left. This movement of the arm 226 is transmitted through the conventional drag-link 228 and steering rod 232 to the steering arms 230 and 234 to shift these arms to the left, resulting in turning the wheels to the right.

During this movement the fluid in chamber 184 is displaced therefrom through the conduit 196 to the cylinder 34. Due to pressure in the chamber 182 the check valve 202 is retained in open position. The tripping of this valve 202 establishes communication between the chamber 182 and the cylinder 34 by way of the conduit 206 and the port 54. The fluid enters the cylinder 34 in the chamber 64 between the cups 62 on the piston 58, where the flow of the fluid is arrested due to closing of the port 116 by movement of the piston 58.

During the compression stroke of the piston 60 to displace the fluid from the cylinder 36 the fluid passes through the port 118 into chamber 104, thence through passage 112 into chamber 108, and introduces pressure in the chamber 108 causing movement of the piston 132. This movement of the piston 132 opens the ports 166 and thereby establishes communication between the reservoir 122 and the cylinder 34 by way of the port 114, chamber 102, passage 110, chamber 106, port 166, passages 158 and 160, through the piston, the chamber 154, and passage 128 to the reservoir.

Now, upon turning the steering wheel to the left to steer the vehicle straight ahead, the pistons 58 and 60 are again shifted in opposite directions. The piston 60 is retracted and the piston 58 is advanced to move the pistons to normal position. At the initial period of this movement pressure in the cylinder 36 is released, resulting in release of pressure in the chamber 108 and consequent movement of the piston 132 under the influence of spring 172 to close the port 166 and shutting off communication between the cylinder 34 and the reservoir. Simultaneously with this movement, fluid in the cylinder 34 is displaced through the port 114 to the chamber 102, introducing pressure in this chamber, causing movement of the piston 130 to open the valve 146 and thereby establish communication between the cylinder 36 and the reservoir.

Further movement of the steering wheel 78 to the left to turn the wheels of the vehicle to straight-forward position, causes the piston 58 to displace fluid from the cylinder 34 through the conduit 196 to the chamber 184 of the cylinder 174, causing movement of the piston 180 to the left. This movement of the piston 180 is transmitted through the rack 218, pinion 220, shaft 222, arm 226, drag-link 228 and steering rod 232 to the steering arms 230 and 234, to turn the wheels to straight-forward position. As the piston 180 is returned to neutral position, fluid in the chamber 182 is displaced through the conduit 194 to the cylinder 36.

When the piston 180 returns to neutral position, should the pistons 58 and 60 remain out of neutral, they are automatically returned to neutral position upon subsequent operation as, for example,—suppose the piston 58 is advanced and the piston 60 is retracted,—upon advancement of the piston 60 by slight movement of the steering wheel, fluid is displaced from the cylinder 36 through the conduit 194 into the chamber 182 of the cylinder 174, thence through port 198, past valve 202, through conduit 206 and port 54, to the cylinder 34 into chamber 64 between the cups 62 on the piston 58, thence through port 116 into the chamber 106, thence through passage 110 to chamber 102, and from this chamber through port 114 to the cylinder 34 forward of the head of the piston 58 to fill that portion of the cylinder 34 forward of the head of the piston. When the pistons 58 and 60 assume neutral position communication between the chambers 34 and 36 and the ports 116 and 120 is established.

Due to expansion of fluid caused by atmospheric conditions, pistons 130 and 132 are automatically actuated to trip the valves 146 and 166 so as to establish communication between the system and the reservoir. Should the fluid in the system contract due to a drop in temperature, fluid will be drawn from the reservoir through the openings 148 and 168 in the heads of the pistons 130 and 132, past the collapsible leakproof cups 150 and 170 thereon into the system.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim is new and desire to secure by Letters Patent is:—

1. A hydraulic steering system comprising an actuating device including a pair of pistons movable concomitantly in opposite directions, an actuated device including a double-acting piston, fluid pressure delivery means coupling the devices, means for transferring fluid from the high pressure end of the double-acting piston to the piston of the actuating device moving on its retraction stroke effective upon movement of the double-acting piston past neutral position on its compression stroke.

2. A hydraulic steering system comprising an actuating device including a pair of pistons movable concomitantly in opposite directions, means for moving the piston, an actuated device including a double-acting piston, linkage connecting the double-acting piston to a steering arm, fluid pressure delivery means coupling the devices, means for synchronizing the actuating device with the actuated device including means effective upon movement of the double-acting piston past neutral position for transferring fluid from the high pressure side of the double-acting piston to the head of the piston of the actuating device moving on its retraction stroke.

3. A hydraulic steering system for a motor vehicle comprising an actuating device including a pair of cylinders having pistons reciprocable therein, means for actuating the pistons concomitantly to move one on its compression stroke and the other on its retraction stroke, an actuated device including opposed cylinders and a double-acting piston reciprocable therein, means connecting the double-acting piston to the steering arm of the vehicle, fluid delivery pipes connecting the respective cylinders of the actuating device to the corresponding cylinders of the actuated device, means for synchronizing the actuating device with the actuated device including fluid return pipes connecting the cylinders of the actuated device to the cylinders of the actuating device, and valves for controlling the flow of fluid from the actuated device to the actuating device operated by pressure created in the system by the movement of the pistons of the actuating device.

4. A hydraulic steering system comprising an actuating device including a pair of pistons, means for actuating the pistons concomitantly to move one on its compression stroke and the other on its retraction stroke, an actuated device including a double-acting piston, means connecting the double-acting piston to a steering arm, fluid pressure delivery means coupling the devices, means for synchronizing the actuating device with the actuated device including means effective upon movement of the double-acting piston past neutral position for transferring fluid from the high pressure side of the double-acting piston to the head of the piston in the actuating device moving on its retraction stroke.

5. A hydraulic steering system comprising an actuating device including a pair of cylinders, a reservoir for supplying fluid to the cylinders, pistons in each of the cylinders, means for simultaneously actuating the pistons to move one on its compression stroke and the other on its retraction stroke, an actuated device including a cylinder, a double acting piston therein, fluid pressure delivery means coupling the respective cylinders of the actuating device to the cylinder of the actuated device, means for synchronizing the actuating device with the actuated device including means effective upon movement of the double-acting piston past neutral position for transferring fluid from the high pressure side of the double-acting piston to the head of the piston in the actuating device moving on its retraction stroke.

6. A hydraulic steering system comprising an actuating device including a pair of cylinders, a reservoir for supplying fluid to the cylinders, a piston in each of the cylinders, means for simultaneously actuating the pistons to move one on its compression stroke and the other on its retraction stroke, an actuating device including a cylinder, a double-acting piston therein, fluid pressure delivery means coupling the respective cylinders of the actuating device with the respective ends of the cylinder of the actuated device, means for synchronizing the actuating device with the actuated device including means effective upon movement of the double-acting piston past neutral position for transferring fluid from the high pressure side of the double-acting piston to the head of the piston in the actuating device moving on its retraction stroke, and valve mechanism controlling the flow of fluid from the reservoir to the cylinders of the actuating device operable by fluid under pressure in one of the cylinders of the actuating device to establish communication between the reservoir and the other cylinder of the actuating device.

ANDREW O. McCOLLUM.